(12) United States Patent
Cody et al.

(10) Patent No.: US 7,756,374 B2
(45) Date of Patent: Jul. 13, 2010

(54) CABLE ASSEMBLY WITH ACCESS POINT

(75) Inventors: Joseph T. Cody, Hickory, NC (US); Angelo M. Fanzo, Jr., Hickory, NC (US); Radawan Hall, Granite Falls, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/080,587

(22) Filed: Apr. 4, 2008

(65) Prior Publication Data

US 2008/0247720 A1    Oct. 9, 2008

Related U.S. Application Data

(63) Continuation-in-part of application No. 11/732,963, filed on Apr. 5, 2007, now Pat. No. 7,515,796.

(51) Int. Cl.
*G02B 6/44* (2006.01)
*G02B 6/46* (2006.01)
*G02B 6/00* (2006.01)

(52) U.S. Cl. .................. 385/114; 385/134; 385/136

(58) Field of Classification Search .......... None
See application file for complete search history.

(56) References Cited

U.S. PATENT DOCUMENTS

| 2004/0156603 | A1* | 8/2004 | Schneider et al. | 385/102 |
|---|---|---|---|---|
| 2005/0129375 | A1 | 6/2005 | Elkins, II et al. | 385/100 |
| 2005/0175308 | A1* | 8/2005 | Elkins et al. | 385/135 |
| 2007/0140640 | A1* | 6/2007 | Temple et al. | 385/134 |

FOREIGN PATENT DOCUMENTS

| WO | 2006/044080 A1 | 4/2006 |
|---|---|---|
| WO | 2006/071412 A1 | 7/2006 |
| WO | 2007/016479 A2 | 2/2007 |

OTHER PUBLICATIONS

Patent Cooperation Treaty, International Search Report for International Application No. PCT/US2008/004380, Jul. 31, 2008, 3 pages.

* cited by examiner

*Primary Examiner*—Omar Rojas

(57) ABSTRACT

A cable assembly comprising a fiber optic cable having an optical ribbon stack therein, at least one network access location for accessing the ribbon stack, and at least one ERL insert assembly, which can include for example at least one resilient plug for holding one or more optical ribbons of the fiber optic cable at, or near, the network access location to inhibit optical ribbon stack movement and torque, for example, translation and/or rotation at the network access point. Also disclosed is a method for inhibiting optical fiber movement or torque, translation and/or rotation at a predetermined position within a fiber optic cable.

23 Claims, 20 Drawing Sheets

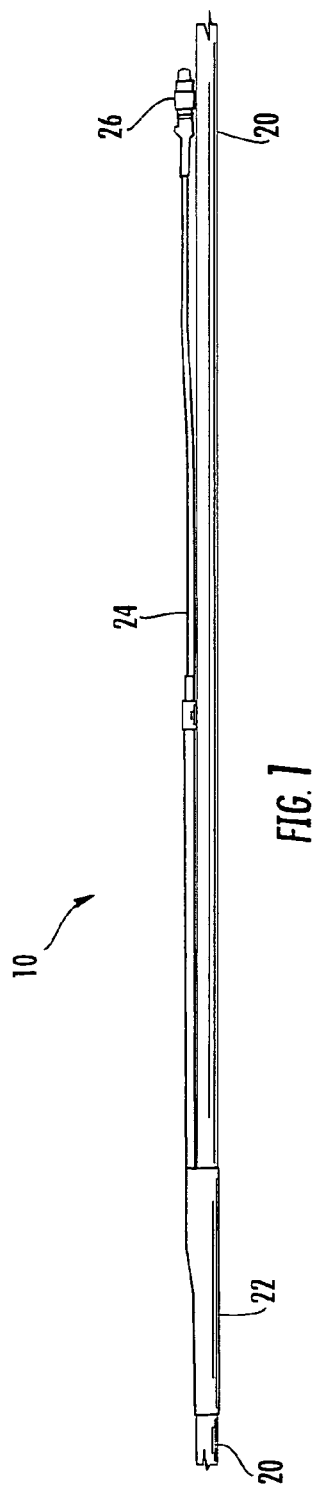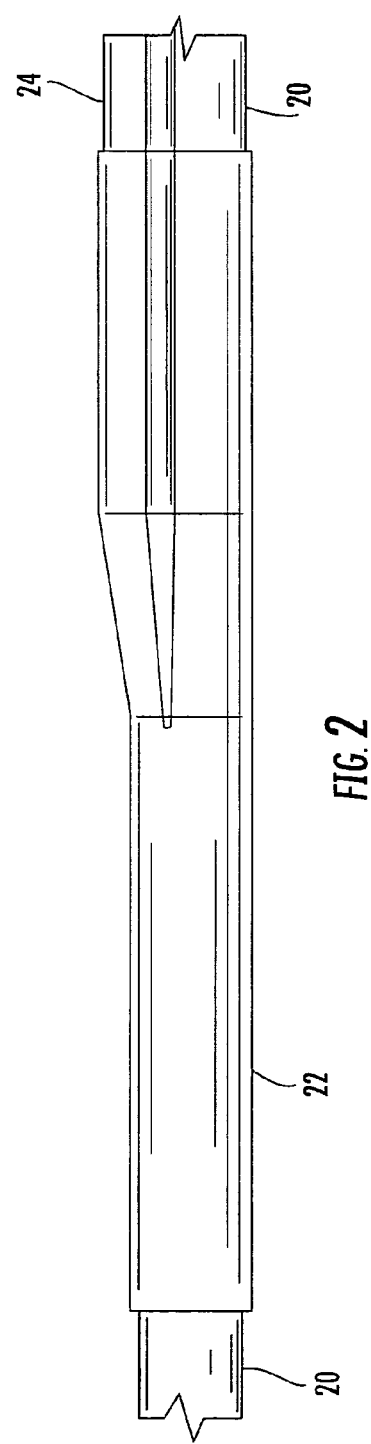

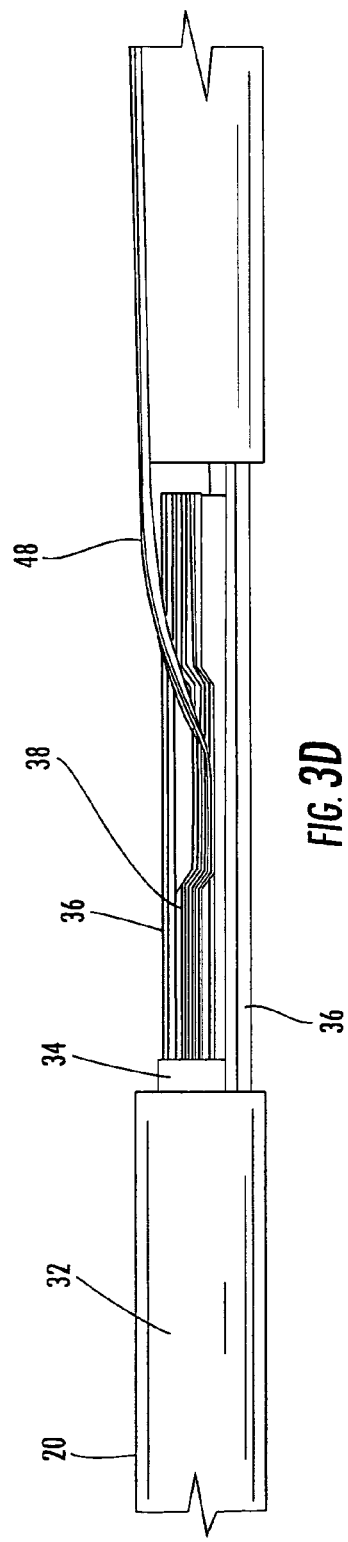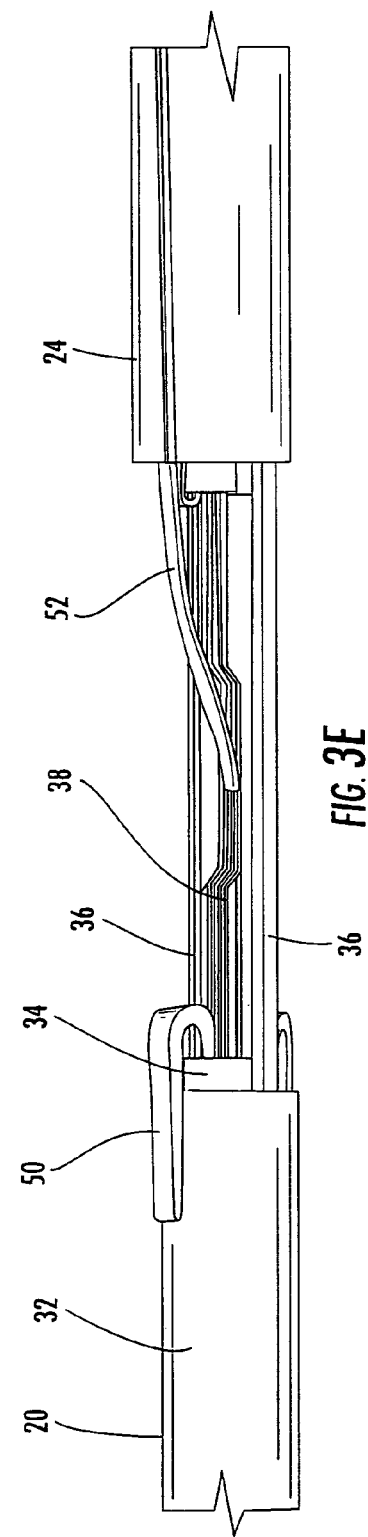

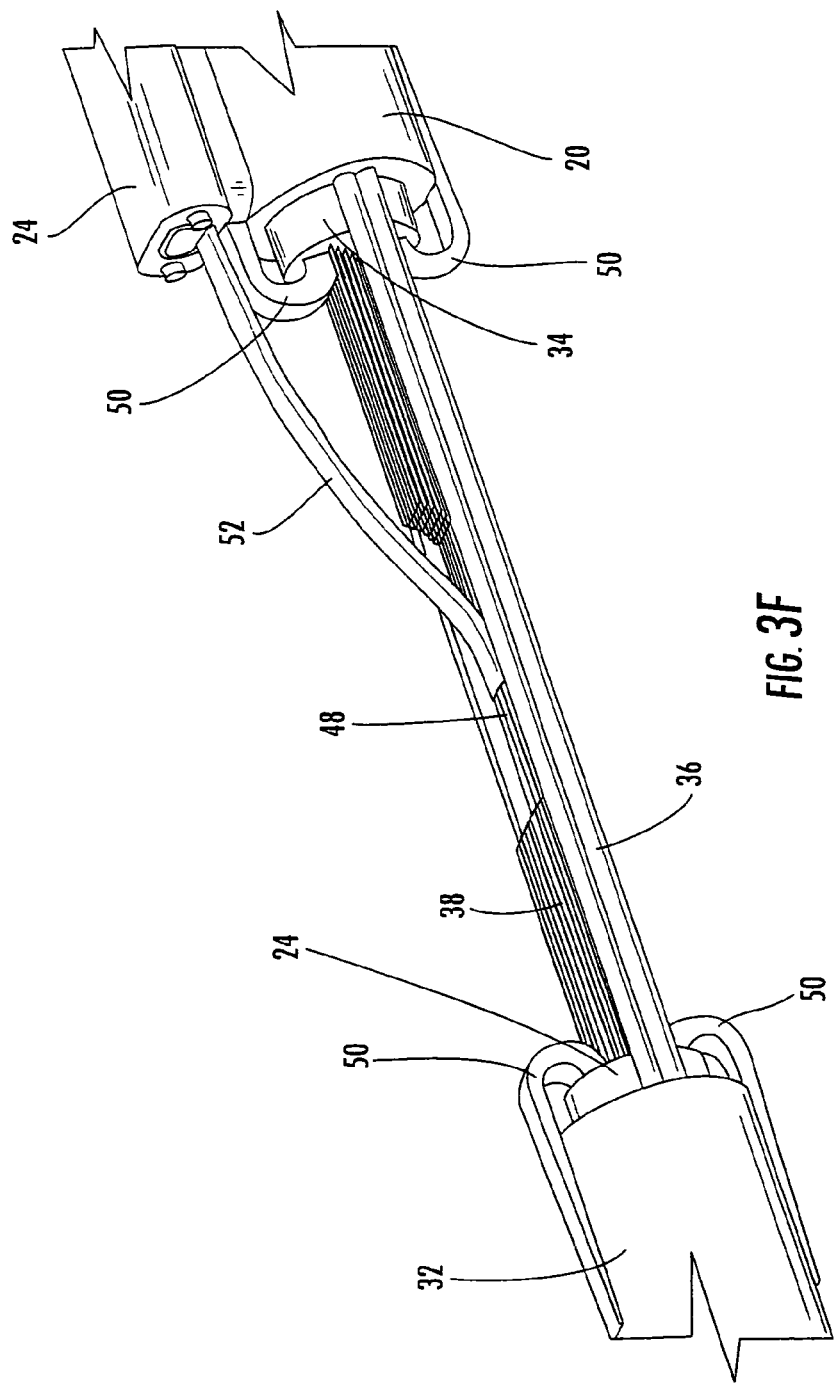

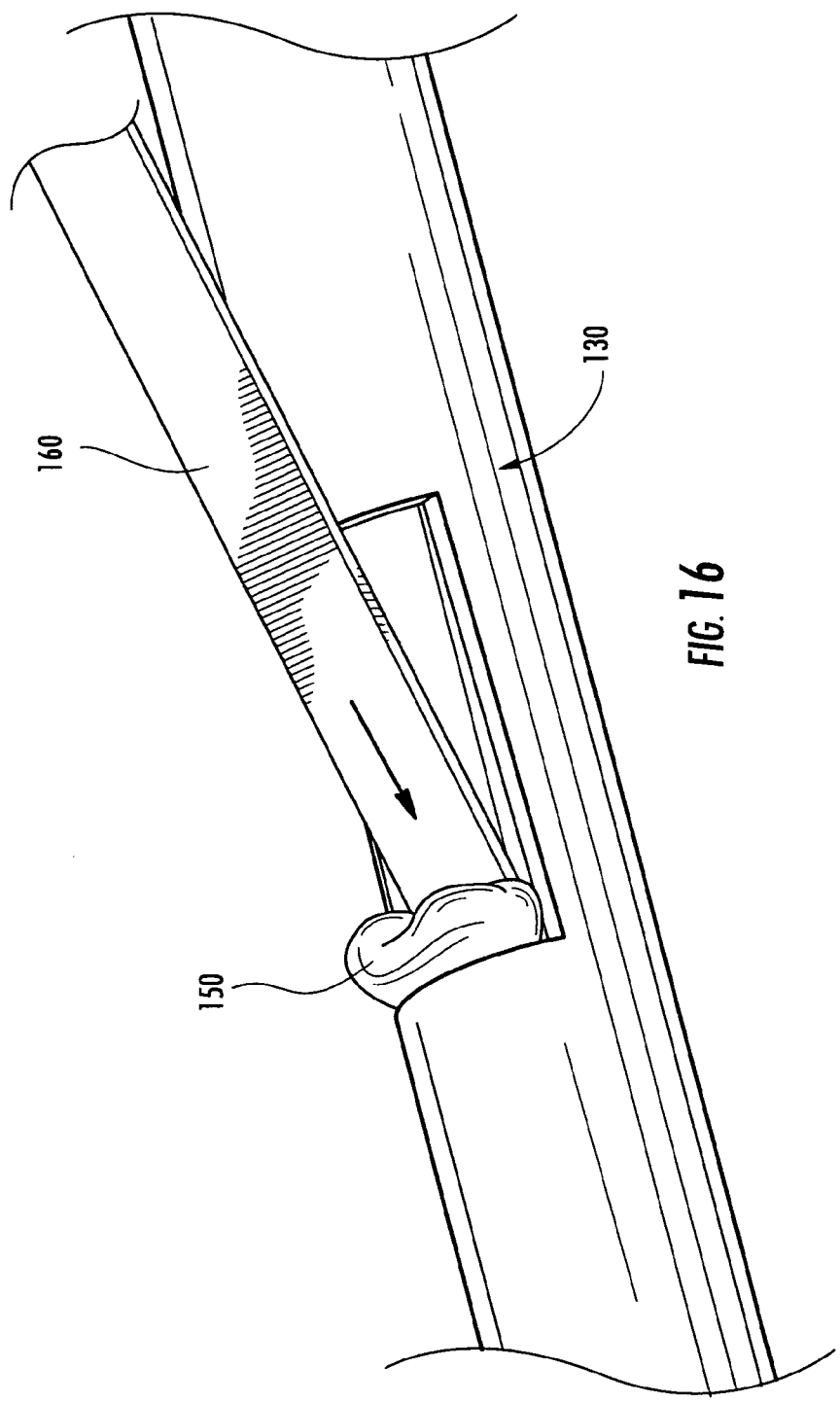

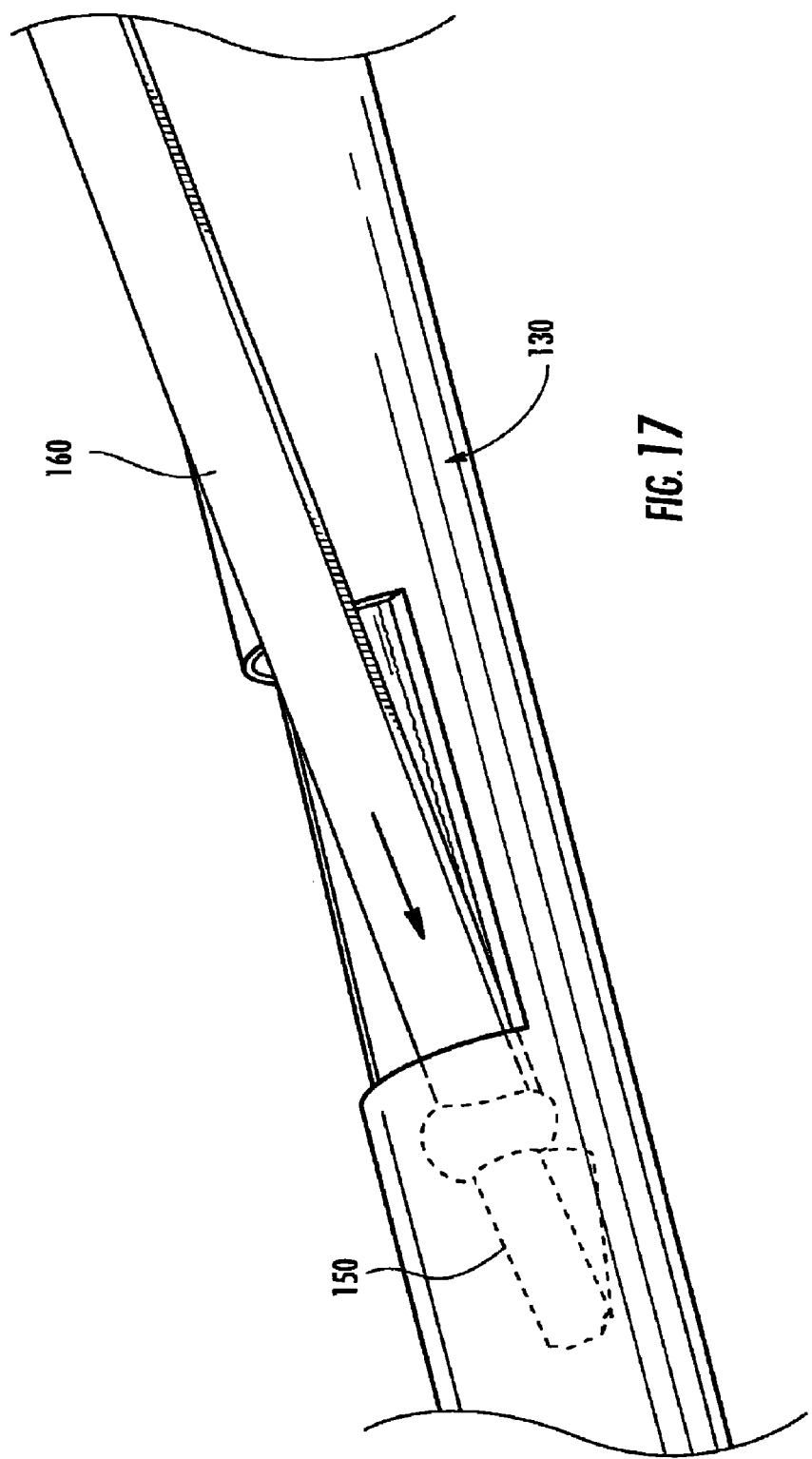

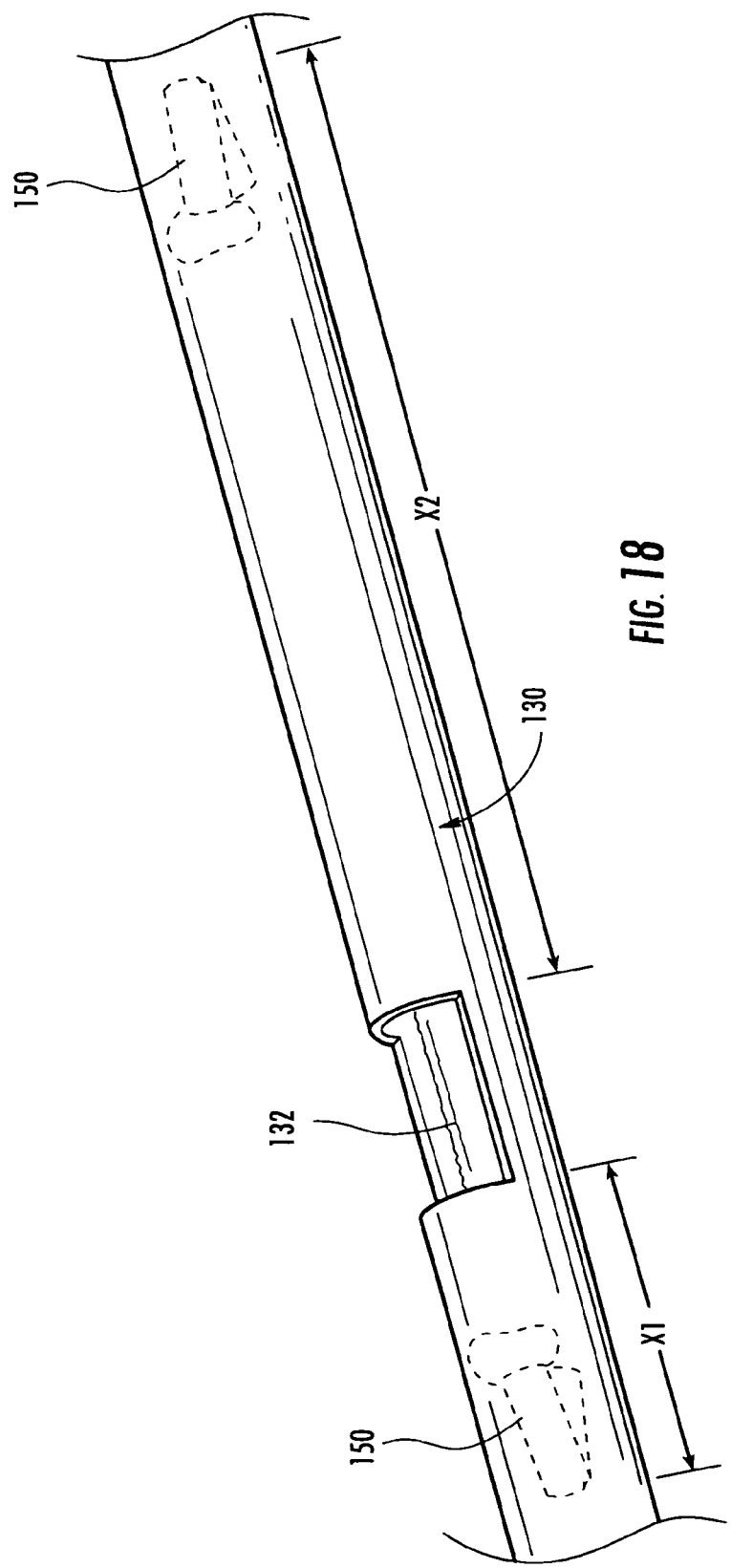

CABLE ASSEMBLY WITH ACCESS POINT

RELATED APPLICATIONS

This application is a Continuation-In-Part (CIP) of U.S. patent application Ser. No. 11/732,963 filed on Apr. 5, 2007 now U.S. Pat. No. 7,515,796, the disclosure of which is hereby incorporated by reference in its entirety.

FIELD OF THE INVENTION

The present invention relates generally to fiber optic cable assemblies deployed in fiber to the premises applications, and more specifically, to fiber optic ribbon cable assemblies including at least one network access point and methods for handling the ribbon stack at, or near, the network access point to address translation and/or rotational issues.

TECHNICAL BACKGROUND

Fiber optic networks are being expanded to provide voice, video, data and other services to subscribers. As a result, different cable types are being used to span both the long and short transmission distances. For kilometer length distribution cables, for example, these cables typically include one or more network access points along the cable length at which pre-selected optical fibers are accessed and preterminated to provide a branch off of the distribution cable. These network access points or "NAPs" are also referred to as "mid-span access locations" or "tap points." Preterminated optical fibers are often spliced or otherwise optically connected to tether or drop cables. The types of networks in which cable assemblies are being developed are often referred to as "FTTx" networks, where "FTT" stands for "Fiber-to-the" and "x" generically describes an end location.

While network access points have been created along cables including non-ribbonized optical fibers, ribbon cables present unique challenges for accessing. Specifically, challenges in how the access is performed, how the fibers are terminated, how the remaining uncut optical fibers or ribbons are handled, and how the cable performs over time and under stress. There are also challenges in mid-span accessing ribbon stack containing cables of various designs. Thus, there is a need in the art for treating a network access point of specific types of ribbon cables.

One type of ribbon cable currently available is the Standard Single-Tube Ribbon (SST-Ribbon™) cable available from Corning Cable Systems of Hickory, N.C. This particular cable is helically wound and contains readily identifiable 12-fiber or 24-fiber ribbons in a filled buffer tube. Dielectric or steel rods are placed about 180 degrees apart in the cable's jacket to provide the required tensile strength for armored and dielectric constructions, respectively. This cable exhibits excellent water-blocking performance and is jacketed with a polyethylene outer jacket and armored cables include a copolymer-coated steel tape armoring.

Another type of ribbon cable currently available includes the SST-Ribbon™ Gel-Free Cable also available from Corning Cable Systems of Hickory, N.C. The cable includes a single buffer tube that contains a stack of up to eighteen 12-fiber ribbons wrapped within a water-swellable foam tape. This central buffer tube is surrounded by a second water-swellable tape. Dielectric or steel strength members are located 180 degrees apart under the cable jacket to provide tensile and anti-buckling strength. The cable sheath is jacketed with a black UV-resistant polyethylene sheath and armored cables include a copolymer-coated corrugated steel tape armor layer. This cable can provide, for example, about 216 fibers in a compact design that can fit within a 1.0 inch inner diameter or larger inner-duct. Coupling features ensure that the ribbon stack and cable act as one unit, providing long-term reliability in aerial, duct and direct-buried applications and minimizing ribbon movement in situations where cable vibration may occur.

What is desired is a cable assembly having at least one network access point and wherein the distribution cable is of a type including a stack of optical fiber ribbons, such as the cable types described above. A desirable ribbon cable assembly would provide structure or material for handling both the uncut ribbon stack portion as well as the preterminated ribbons. Further, what is desired are methods of creating network access points along a ribbon stack containing fiber optic cable that handles ribbon stack rotational and/or translational issues.

SUMMARY OF THE INVENTION

In various embodiments, the present invention provides ribbon stack handling for non strain free cables at a network access point to address translation between the core and the cable sheath. Benefiting ribbon cables of the present invention include a ribbon stack, that may or may not be helically wound, that is loosely coupled to the cable sheath or a core tube. To provide for robust installation properties, the present invention provides various designs for treating the ribbon stack relative to the sheath or core tube at the network access point to solve translational and/or rotational issues. In one aspect, the invention includes a cable assembly with a fiber optic cable including a ribbon stack therein, at least one network access location positioned along the fiber optic cable at which at least one fiber of the ribbon stack is preterminated at the network access point, and at least one ERL insert assembly, which can include for example at least one resilient plug at least partially disposed within the fiber optic cable for holding the ribbon stack to the fiber optic cable to inhibit optical ribbon stack movement or torque, and translation at the network access point relative to the fiber optic cable.

Additional features and advantages of the invention are set out in the detailed description which follows, and will be readily apparent to those skilled in the art from that description or recognized by practicing the invention as described herein, including the detailed description which follows, the claims, as well as the appended drawings.

BRIEF DESCRIPTION OF THE DRAWINGS

FIG. 1 is a perspective view of a cable assembly including a flexible NAP, a tether and ribbon stack lock down about the NAP.

FIG. 2 is a perspective view of the flexible NAP portion of the cable assembly of FIG. 1.

FIG. 3D is a perspective view of the cable of FIG. 3C shown with the gel cleaned away and selected optical fibers terminated.

FIG. 3E is a perspective view of the cable of FIG. 3D shown with ribbon stack orientation aided by anti-torque inserts.

FIG. 3F is a perspective view of the cable of FIG. 3E shown with the preterminated ribbon entering a tether.

FIGS. 15-17 depict perspective views showing the ERL insert assembly of FIG. 14B being inserted into the tubeless ribbon cable of FIG. 13 using an appropriate tool.

FIG. 18 is a perspective view showing the locations of both an upstream ERL insert assembly and a downstream ERL insert assembly within the ribbon cable.

DETAILED DESCRIPTION OF THE INVENTION

Figure 3A:
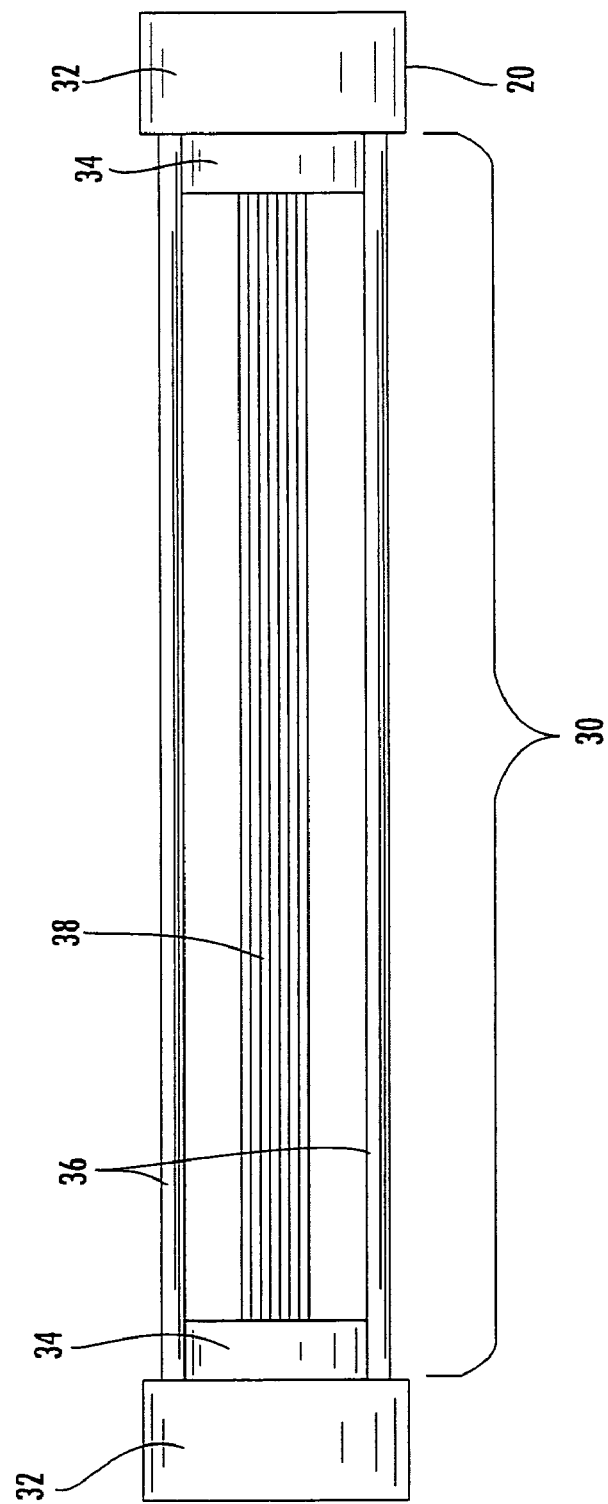
FIG. 3A is a perspective view of a portion of a ribbon cable shown with a portion of the cable sheath, the core tube and the foam tape removed.

Referring to FIGS. 1 and 2, the present invention provides cable assemblies including flexible network access points for both indoor and outdoor applications. Although only a portion of an entire cable assembly is shown, a cable assembly of the present invention includes a fiber optic ribbon containing distribution cable having one or more network access points positioned at predetermined locations along the cable length. Flexible network access points have some degree of flexibility to facilitate installation and are used as tether or drop cable attachment points for branching preterminated optical fibers of the cable. As shown, the cable assembly 10 includes a ribbon containing distribution cable 20 having a flexible network access point covering 22 substantially enclosing or encapsulating the access location. Suitable coverings include, but are not limited to, heat shrink closures and overmolded closures. The assembly 10 further includes at least one tether 24, also referred to herein as a "drop cable," a portion of which is secured within or about a portion of the flexible covering 22. Each tether 24 attached to the distribution cable may terminate in one or more connectors 26, one or more connectors within a receptacle, a multiport connection terminal, splice ready optical fibers or any other means for optically connecting the tether to other optical fibers, cables or devices. Optical fibers of the tether 24 are spliced or otherwise optically connected to preterminated optical fibers of the distribution cable 20 that exit at the network access point. The distribution cable may be of any type including a plurality of optical fiber ribbons, such as an SST-Ribbon™ Gel-Free Cable available from Corning Cable Systems of Hickory, N.C. This particular cable type includes a helically wound ribbon stack, a pair of strength elements and at least one layer of water-swellable tape all disposed within a cable sheath.

Figure 3B:
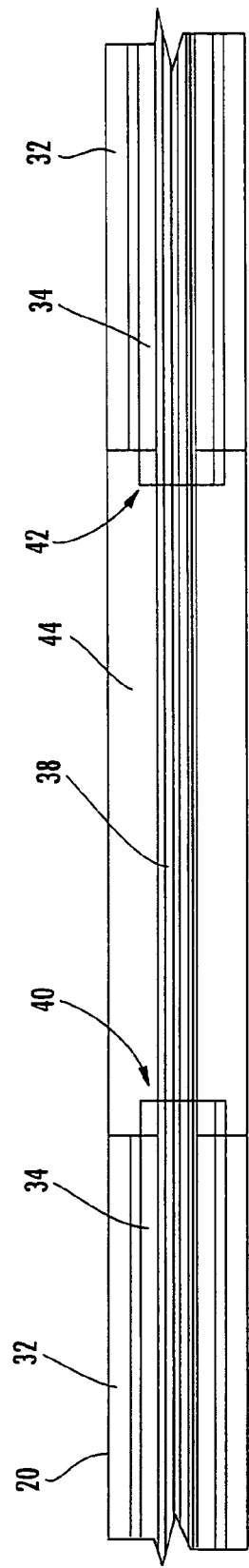
FIG. 3B is a perspective view of the ribbon cable of FIG. 3A shown with a gel inserted into both ends cut portions of the sheath to bond the ribbon stack to the core tube.
Figure 3C:
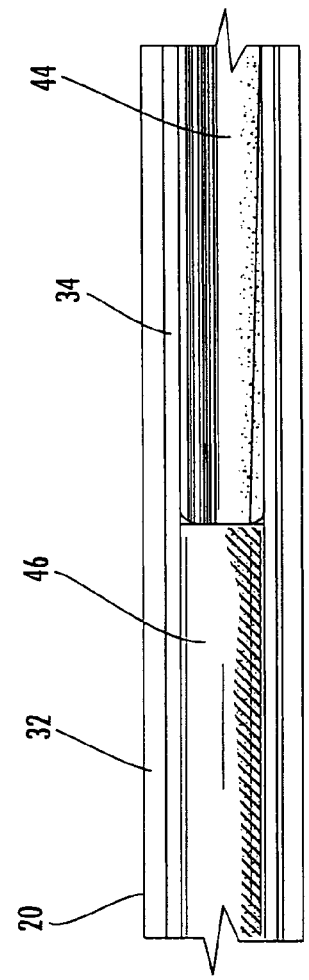
FIG. 3C is a perspective view of the cable of FIG. 3B shown with the gel encountering the foam tape inside the cable that acts as a barrier to further penetration.

Referring to FIGS. 3A-F, one embodiment of network access point creation and ribbon stack lockdown are shown in various stages of construction. Referring specifically to FIG. 3A, a portion of the distribution cable 20 is shown with a portion of the cable sheath 32 removed. The length of the network access location is shown at reference number 30 and has a length sufficient to access the ribbon stack and preterminated, pre-selected optical fiber ribbons 38. This "access window" may range in length from about a few inches to more than 12 inches. A portion of the core tube 34 is also removed at the access location to provide access to the ribbon stack. The strength elements 36 preferably remain uncut at the access location. One or more layers of foam tape are also removed to provide access to the ribbon stack 38, and using an access tool the foam tape is removed on each side of the access window a predetermined distance, for example, about 1 meter. Referring to FIGS. 3B and C, gel 44 is inserted into both directions 40 and 42 to gently bond the ribbon stack 38 to the core tube 34. The gel 44 encounters the foam tape 46 deep inside the distribution cable 20. The foam tape 46 acts as a barrier for leaching further into the cable structure.

Referring specifically to FIG. 3D, the gel at the network access point is cleaned away from the opening. Ribbon fibers of the stack 38 that have been preterminated, or "cut," at other upstream tap points are removed and the pre-selected ribbon 48 that will supply the particular tap point shown is tool accessed using a ribbon access tool and exits the cable 20. In alternative embodiments, only the fibers that are needed at a network access point are cut, leaving the remaining stack intact. Referring to FIG. 3E, the ribbon 48 is spliced to tether fibers of the tether 24 and a ribbon buffer tube 52 may be installed over the exiting ribbon. Ribbon stack orientation is aided by one or more anti-torque alignment inserts 50 that are inserted into the open ends of the cable 20 between the ribbon stack 38 and the core tube 34. The anti-torque alignment inserts 50 are shown in more detail in FIG. 4.

Referring to FIG. 3F, a perspective view of the network access point assembly is shown with the preterminated ribbon 48 entering the tether 24. The ribbon stack 38 is helically wound within the cable 20 and is locked in place relative to the core tube 34 at the access point using a relatively hard epoxy or epoxy-like material known in the art. The epoxy material is contained using the more flexible material inserted into each end of the cable access point to block the flow of the epoxy material down the internal cavity of the cable and minimize the fiber stresses as the helix is driven up against the tap during installation. The lock down prevents the helically wound stack from rotating at the tap point as well as translating relative to the cable sheath. The ribbon stack may be split up or separated to promote the spread of the epoxy-like material through the stack and increase the bonding surface area. In one embodiment, a long bonding length using a soft elastomer may be used to address ribbon stack translational and rotational issues at the network access point. One material suitable for use in the present invention is a low viscosity urethane as is known in the art. In another embodiment, a short bonded approach in which a short length of the ribbon stack is bonded to the core tube using an epoxy-like material may be used to address the ribbon stack translation and rotational issues at the network access point.

Figure 4:
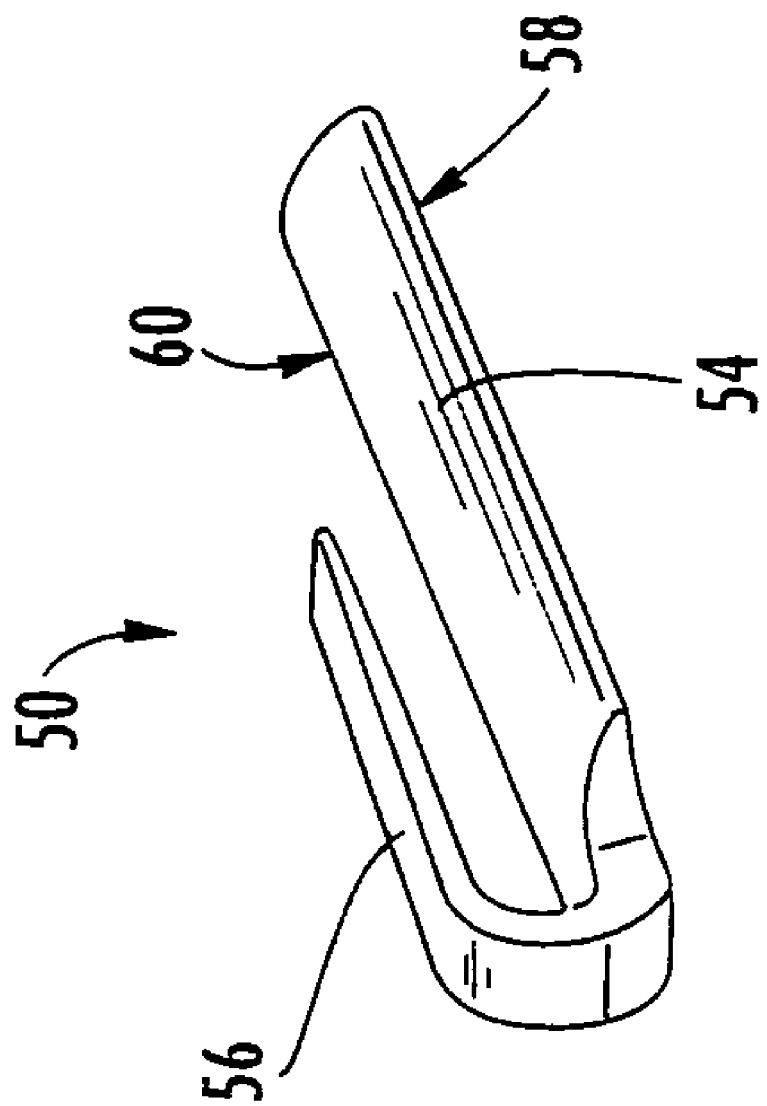
FIG. 4 is a perspective view of an anti-torque alignment insert.

Referring to FIG. 4 an isolated view of an anti-torque alignment insert 50 is shown. The insert 50 is generally U-shaped and includes a first generally flattened portion 54 that is inserted between the ribbon stack and the core tube and a second portion 56 that contacts the outer portion of the cable sheath. Thus, the insert 50 maintains the sheath and core tube between the first and second portions 54 and 56. The first portion 54 may define a flat surface 58 for contacting the ribbon stack and a domed surface 60 that fits against the interior surface of the core tube. The insert may optionally be installed in either the long-bonded or short-bonded approaches.

Figure 5:
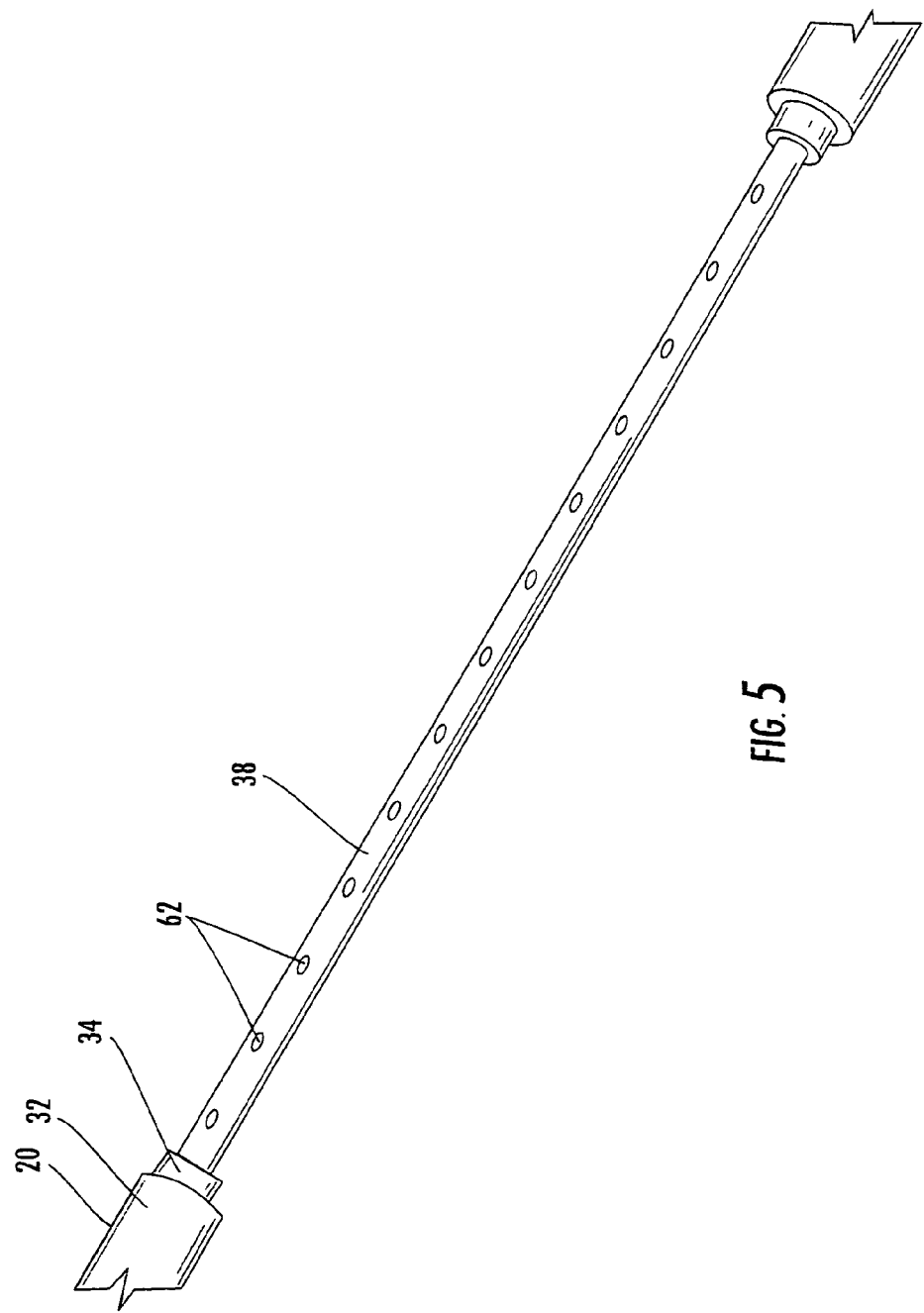
FIG. 5 is a perspective view of a marker detectable by x-ray or other radiation for determining the orientation of the ribbon stack at a selected point along the cable.

Referring to FIG. 5, one or more markers 62 such as a series of shapes can be observed by X-ray to determine the orientation of the ribbon stack by measuring the short axis width of the shape. At the maximum or specified width, the stack is "flat." In an all dielectric cable, alternative ribbon stack marking may include installing a foil layer in the ribbon stack. The foil may be viewed at full width when normal to the X-ray beam. By marking the strength member location on the exterior of the cable, the cable may be moved through a beam chamber with the plane of the strength members normal to the beam until the foil width is full value. This spot may then be marked and the cable opened at this point. To obtain "top and bottom" information, it would be possible to use two foil layers, and one layer may be perforated or otherwise marked to denote either top or bottom. Alternative cable markings may include strips, dots or any, non-continuous pattern. Alternative ribbon stack orientation methods may include ultrasound without the need for a foil layer.

Figure 6:
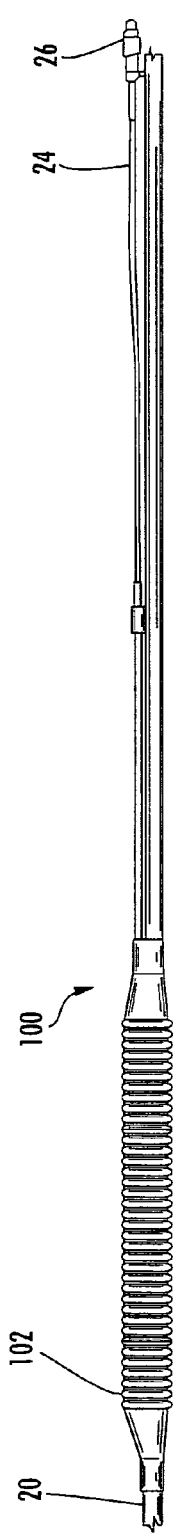
FIG. 6 is a perspective view of a portion of a cable assembly including floating ribbon stack handling structure.
Figure 7:
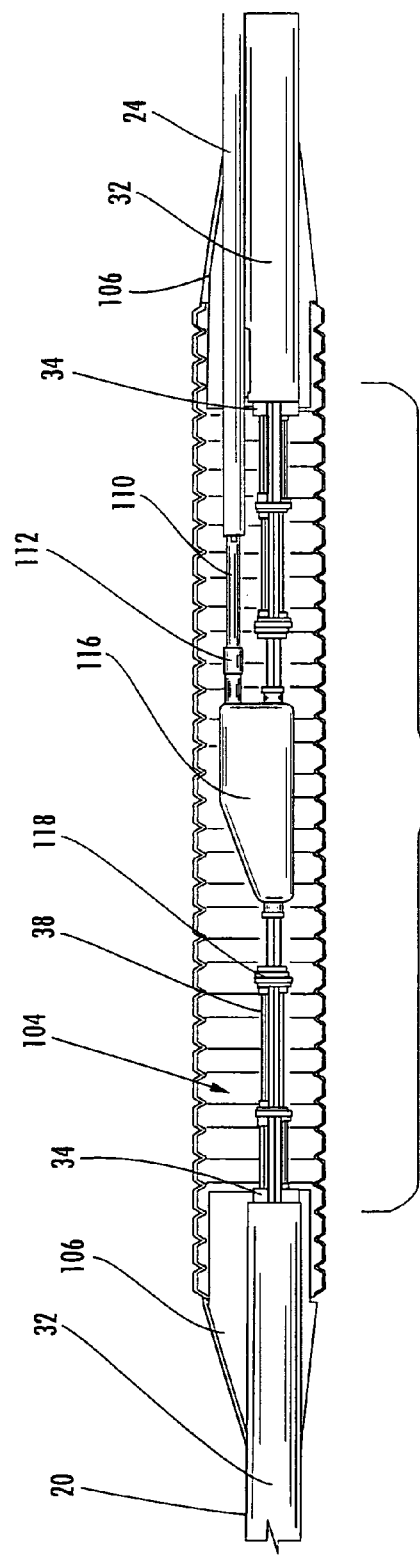
FIG. 7 is a perspective view of assembly of FIG. 6 shown a portion of the protective covering removed.
Figure 8:
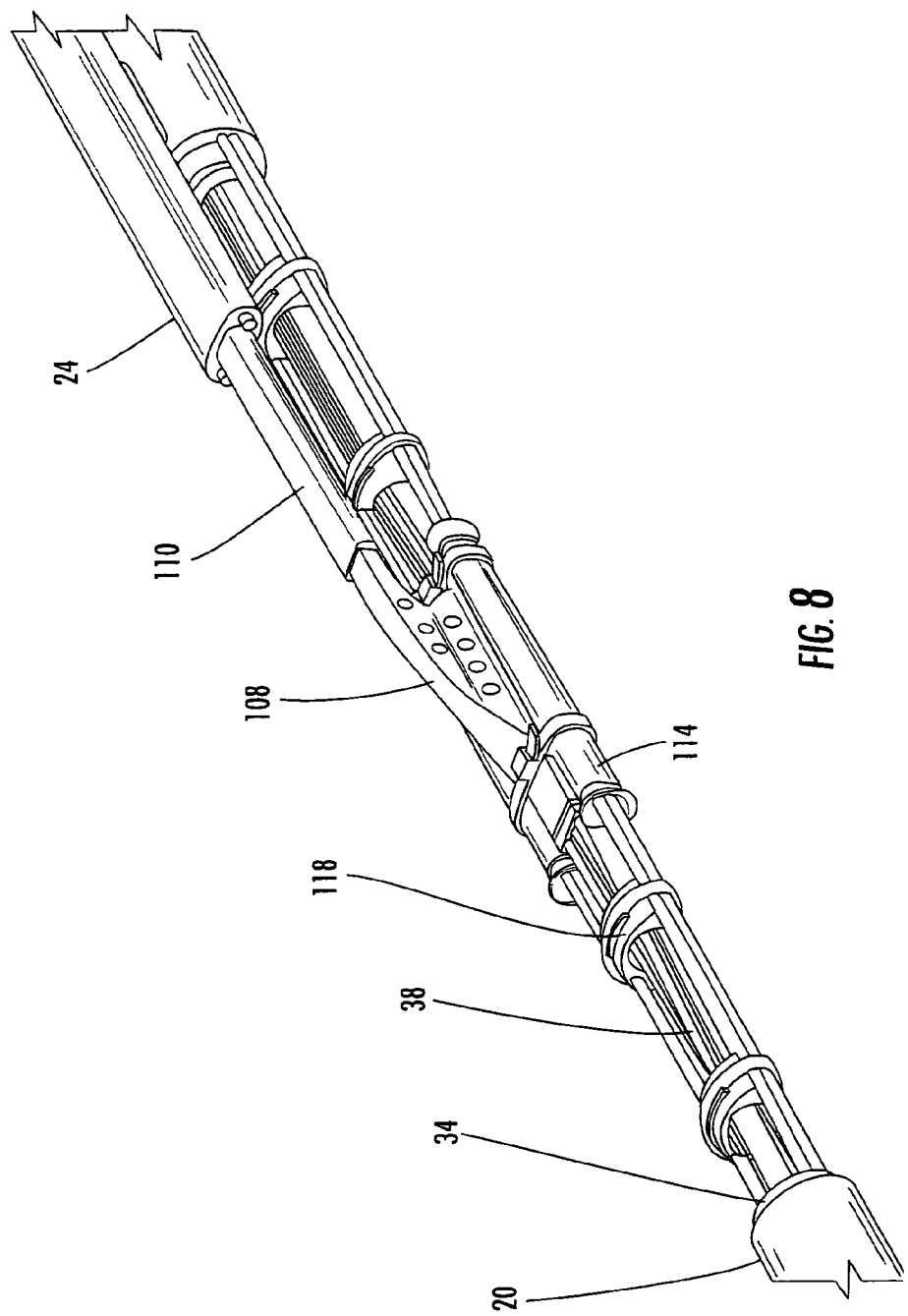
FIG. 8 is a perspective view of the assembly of FIG. 7 shown the protective covering and a ribbon covering removed.
Figure 9:
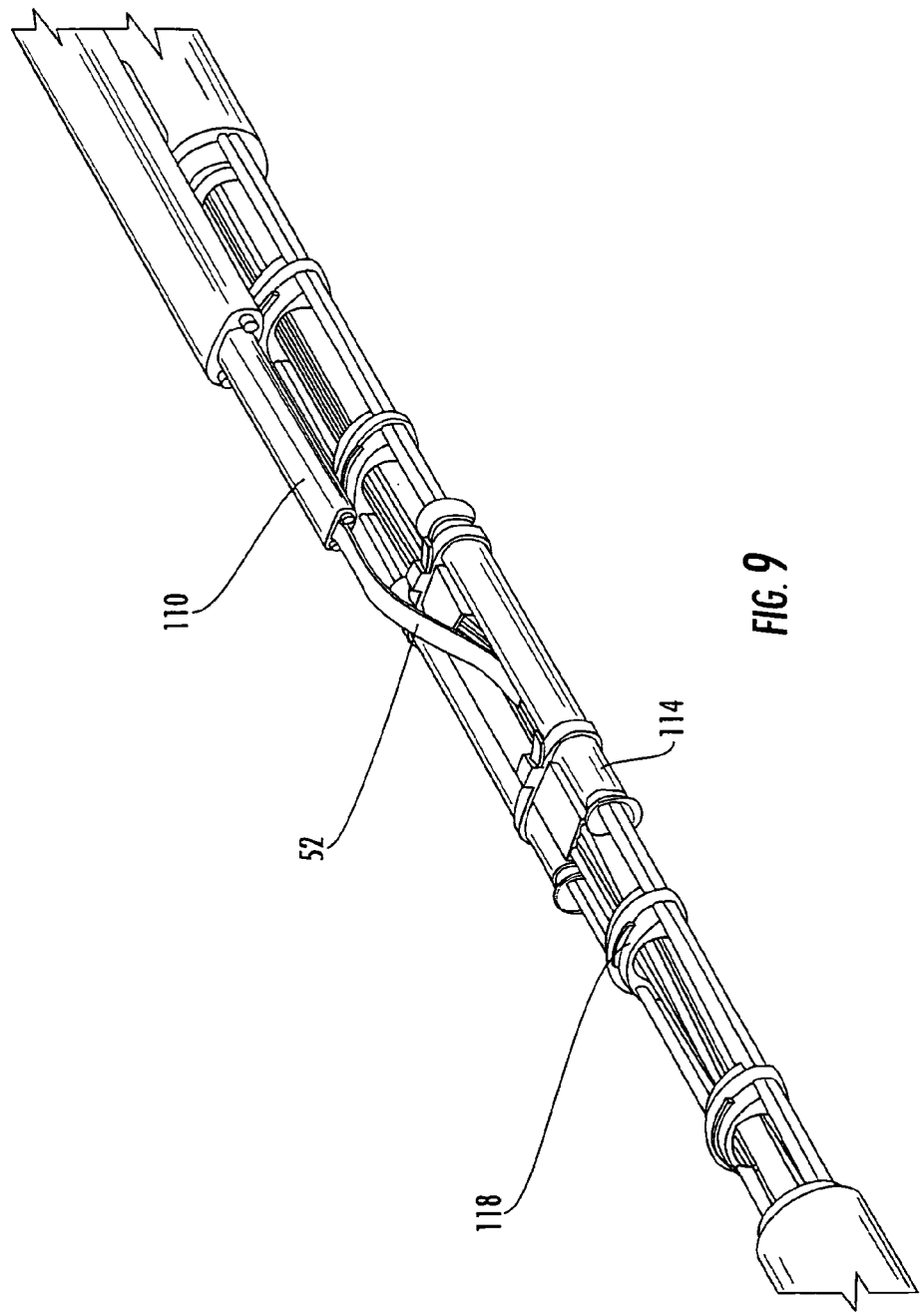
FIG. 9 is a perspective view of a cable assembly of FIG. 8 illustrating the exiting fiber ribbon.
Figure 10:
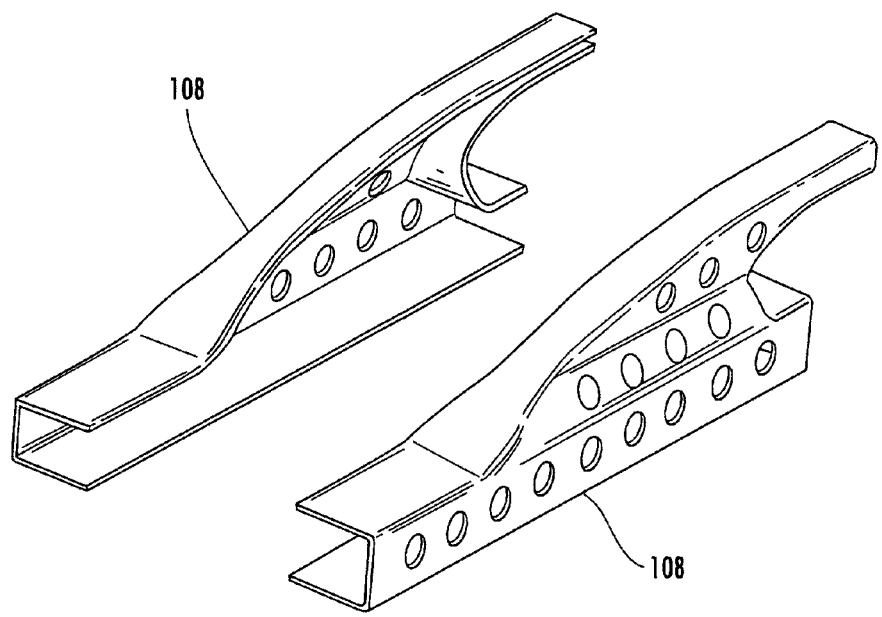
FIG. 10 is a perspective view of a fiber ribbon routing structure.
Figure 11:
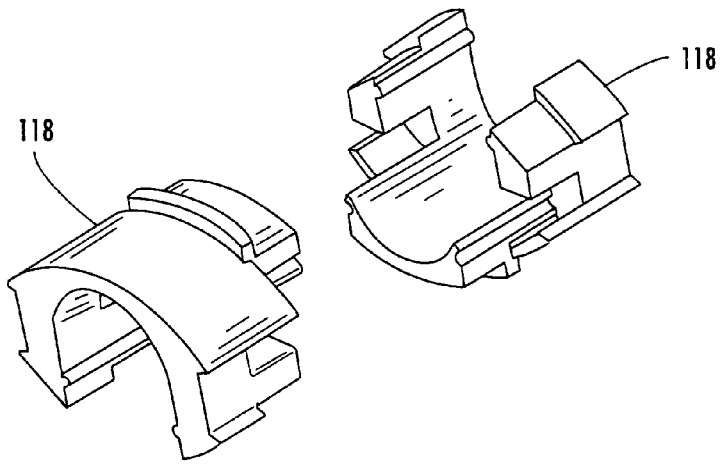
FIG. 11 is a perspective view of ribbon stack and strength element handling structure.
Figure 12:
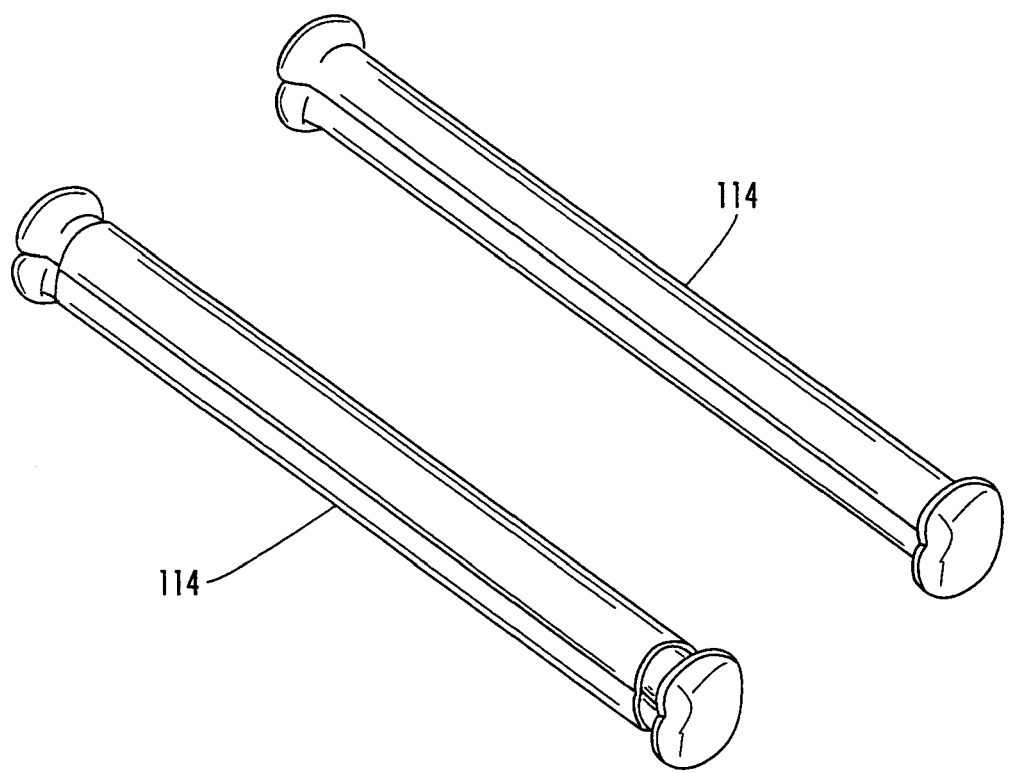
FIG. 12 is a perspective view of crimp-on metal sleeves.

Referring to FIGS. 6-12, an alternative design to address translational and torque issues at a network access point of a helically stranded ribbon cable is provided. In this embodiment, the cable assembly includes a network access point and ribbon stack organizer capable of translating within a cavity. Torque is resisted by coupling the organizer loosely to the strength elements of the cable, such as glass reinforced plastic elements. Referring specifically to FIG. 6, the cable assembly includes flexible network access points for both indoor and outdoor applications. Although only a portion of an entire cable assembly is shown, a cable assembly of the present invention includes a fiber optic ribbon containing distribution cable having one or more network access points positioned at predetermined locations along the cable length. As shown, the cable assembly 100 includes a ribbon containing distribution cable 20 having a flexible, ruggedized network access point covering 102 substantially enclosing the access location and forming a cavity 104. The assembly 100 further includes at least one tether 24, also referred to herein as a "drop cable," a portion of which is secured within or about a portion of the flexible covering 102. Each tether 24 attached to the distribution cable may terminate in one or more connectors 26, one or more connectors within a receptacle, a multiport connection terminal, splice ready optical fibers or any other means for optically connecting the tether to other optical fibers or a device. Optical fibers of the tether 24 are spliced or otherwise optically connected to preterminated optical fibers of the distribution cable 20 that exit at a network access point. The distribution cable may include a helically wound ribbon stack, a pair of strength members and at least one layer of water-swellable tape all disposed within a cable sheath.

Referring to FIGS. 7-12, all or a portion of the covering 102 is removed in order to illustrate the underlying components. As in the previous embodiment, a portion of the cable sheath 32, core tube 34 and water-swellable tapes are removed to access the ribbon stack 38. A floating network access point may be created by first threading the covering 102, that may be a crush-resistant tubing, and heat shrink end-caps 106 onto the distribution cable 20, placing the cable in a network access point station, ring cutting the cable sheath 32 in two places about 9 to about 12 inches apart, slitting the cable sheath along the strength members on both sides and removing the casing from around the core tube 34. Next, the core tube 34 may be ring cut as close to the sheath as possible. This may be determined by the proximity of the strength members and how easily a technician is able to reach between the strength members and the core tube. The core tube 34 is also slit along its length and then removed. Next, the foam tape is trimmed from around the ribbon stack. The ribbon stack 38 is supported and aligned horizontally in its natural twist in the center of the access opening. The pre-selected ribbon that will be cut is then identified and cut away enough to allow the ribbon of interest to egress from its location away from the ribbon stack.

In the case of a 24-fiber ribbon, the ribbon can be split into two 12-fiber ribbons. Using tool access techniques, the split is extended a length sufficient into the cable structure to cut the required length of ribbon fiber to enable the splicing of tether fibers, for example, as much as 9 or 10 inches. Once cut, the tether fibers are isolated and the ribbon stack is secured to itself. A ribbon buffer tube 52 is installed over the tether fibers about 7 to 10 inches in length. The exit fiber/buffer tube guide 108 is closed around the buffer tube locking it in place. The attitude of the exit ribbon and buffer tube as it leaves the guide should be about parallel to the long axis of the distribution cable. A cable carcass 110, drop cable carcass, and heat shrinks 112 are threaded onto a completed tether assembly, keeping the ribbon to be spliced exposed.

The tether ribbon is spliced to the exit ribbon. In the case of a bend performance fiber ribbon or other ribbon type, a 360 degree slack loop or coil may be made about the spliced together fiber portions. Once spliced, the drop carcass and a length of heat shrink are slid over the ribbons and the splice until the drop carcass abuts the nose of the exit fiber guide. The heat shrink is positioned over the two and heated to secure the drop carcass to the exit fiber guide. The distribution carcass is positioned roughly several inches from the nose of the exit fiber guide and secured to the cable sheath, and to the tether by way of the heat shrink.

Two metallic crimp crimp-on sleeves 114 are installed around the strength member pairs. Heat shrink tape is wrapped around both sleeves and secured. The sleeves 114 are strapped to the exit fiber guide 108 using ties. A mold 116 is placed around the entire assembly and flooded with a urethane, creating a localized lock-down point against torsion and ribbon pull-out. A "comb-like" structure may seal the ribbons and keep the potting material from wicking along the ribbon stack. The heat shrink tape keeps the urethane out of the crimp-on sleeves, allowing the entire assembly to react axially to pushing and pulling. The SST drop carcass is able to translate within the RPX carcass. Split ring ribbon stack management components 118 are placed around the ribbon stack and secured to the strength member pairs with ties. This aids the stack from bunching and in transmitting forces axially. The end cap molds 106 are positioned over the ends of the cable sheath and potting material is injected. The flexible covering 102 is slid over the end caps and secured with heat shrink material, environmentally sealing the entire network access point.

In various embodiments, the cable assemblies, components and bonding materials may include flame retardant additives as required in indoor applications. Specifically, the cable assemblies preferably meet or exceed the UL1666 flame test for riser applications, a test for flame propagation height of electrical and optical fiber cables installed vertically in shafts. The cable assemblies also preferably meet or exceed the NFPA 262 flame test, the standard method of test for flame travel and smoke of wires and cables for use in air-handling spaces. The cable assemblies may include OFNR interior cables that do not contain electrically conductive components and which are certified for use in riser applications to prevent the spread of fire from floor to floor in an MDU and are ANSI/UL 1666-1997 compliant. The cable assemblies may be LSZH (low smoke zero halogen) compliant and do not produce a Halogen gas when burned.

Figure 13:
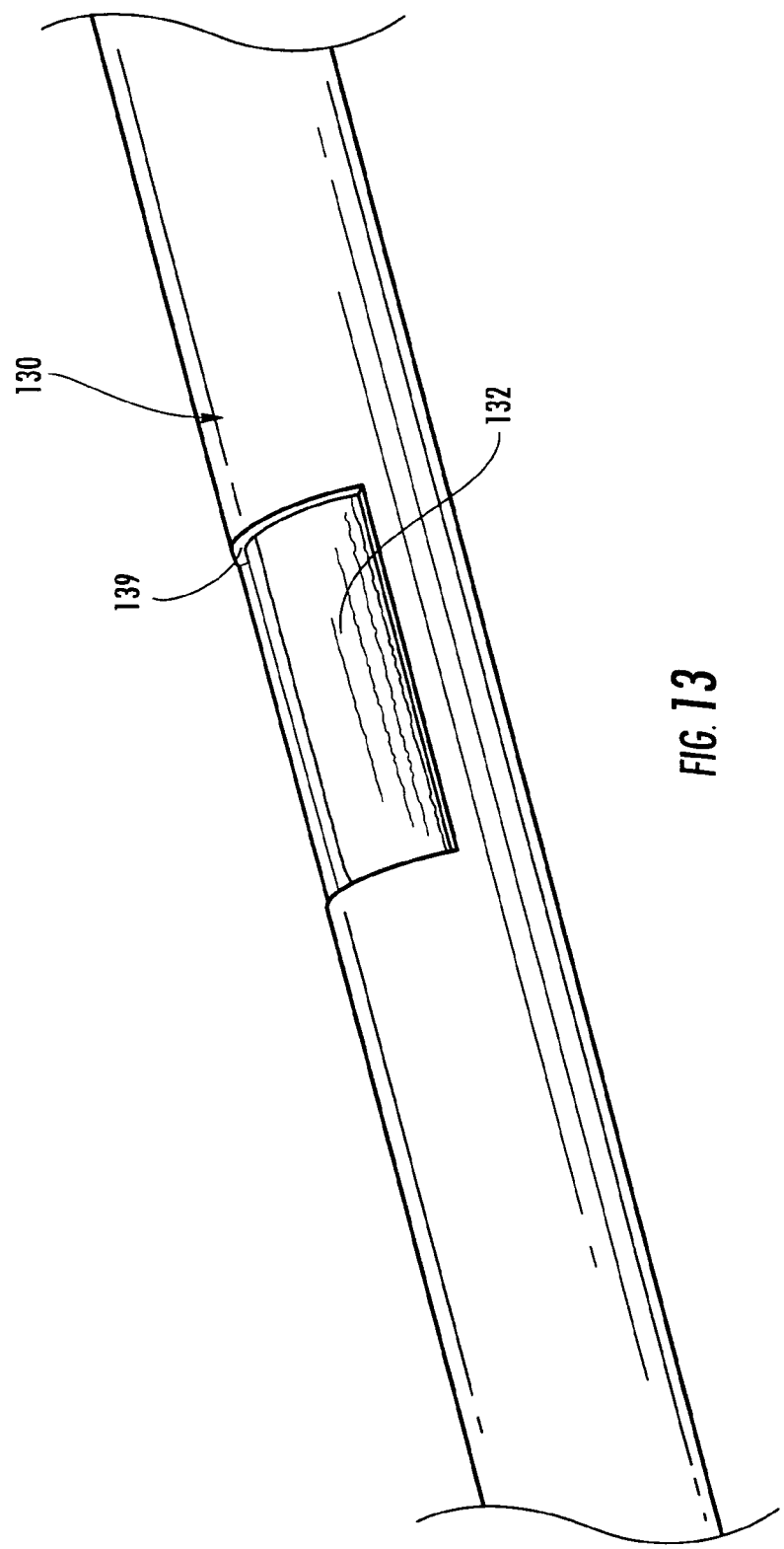
FIG. 13 is a perspective view of a portion of a tubeless ribbon cable shown with a portion of the cable sheath removed to access the cavity.

The concepts of the present invention can also employ other structures for inhibiting the movement, translation and/or rotation of a portion of a ribbon stack at, or near, the network access location. For instance, FIG. 13 depicts a perspective view of a portion of fiber optic ribbon cable 130 which may include buffer tubes or core tubes with optical fibers in the tubes but it is preferably a tubeless fiber optic cable, as shown with a portion of a cable sheath 139 removed (i.e., the access window) for accessing the cavity housing a ribbon stack (not visible). As used herein, a tubeless fiber optic cable means that the cable does not have a core tube for housing the ribbon(s), but instead the ribbon(s) are disposed within a cavity of a cable sheath, thereby eliminating the need to breach a core tube to access the ribbon(s). Additionally, fiber optic cable 130 is a dry cable. In other words, fiber optic cable 130 does not include a thixotropic grease or gel for water-blocking, cushioning, coupling, etc. Instead, fiber optic cable 130 can include one or more dry inserts 132 for water-blocking, cushioning, coupling, and the like. Further, fiber optic cable 130 is a non-round tubeless cable having a non-stranded ribbon stack (i.e., the ribbon stack is not stranded within the cavity of the cable sheath).

More specifically, fiber optic cable 130 has two dry inserts 132 disposed at the top and bottom of the non-stranded ribbon stack, thereby forming a ribbon/dry insert sandwich. In this case, dry inserts 132 are longitudinal foam tapes having one or more water-swellable layers attached thereto, but other suitable types of dry inserts are possible. Since ribbon stack of fiber optic cable 130 is non-stranded, a larger excess ribbon length (ERL) is desired. ERL is the excess length of the optical ribbons in relation to the axial length of the cable, and it is often measured as a percentage, so that for positive ERL, the optical ribbon length is longer that the axial length of the cable and is above zero percent. The aperture in the cable jacket can cause the optical ribbons to undergo torque and other forces and they can come out of the cable sheath aperture, thereby dissipating the ERL. Consequently, the ribbon stack should be fixed relative to the cable as by being locked down at, or near, the network access point to inhibit the ERL from dissipating when the cable sheath is breached to create the network access point.

As disclosed above, insert 50 is shown can resist optical ribbon movement and torque and other forces acting on the ribbon stack and control ERL. Another structure according to the invention that is useful for inhibiting movement, torque, translation and/or rotation of ribbon(s) is at least one ERL insert assembly, for example an ERL insert assembly 150, which can take the form of a resilient ERL insert assembly, and in an exemplary embodiment it includes at least one resilient plug for example at least one resilient plug 140. One or more ERL insert assemblies can be installed on the same side of the network access area, or one or more ERL insert assemblies can be installed on opposing sides of the network access area. One example of resilient plug 140 is a foam plug such as an ordinary foam ear plug used to inhibit hearing loss, but other suitable inserts are possible for the ERL insert assembly. For example, the at least one ERL insert assembly should have suitable elastomeric, compressibility and flexibility characteristics for holding the optical ribbon stack against movement relative to the cable jacket or buffer or core tube. For example, the ERL insert may comprise: at least one foam member of large or small foam cell size; a hard or soft thermoplastic, elastomer, or rubber substance in the form of for example a tube that has suitable visco-elasticity and hardness characteristics; a KRATON® polymer or the like; a water swellable member or water swellable coated member with super-absorbent material thereon for absorbing water; a spring of metal or plastic for example a leaf, serpentine, or coil spring; a bladder such as a balloon type member; a compressible fabric, weave, or mesh; or one or more combinations of the foregoing. Resilient plug 140 may be placed at, or near, the opening of the access window (i.e., disposed at least partially in the fiber optic cable) as discussed above or inserted into the fiber optic cable to inhibit translation and/or rotation of the ribbon(s). Additionally, resilient plug 140 may be a portion of a ERL insert assembly that is disposed within the fiber optic cable.

Figure 14A:
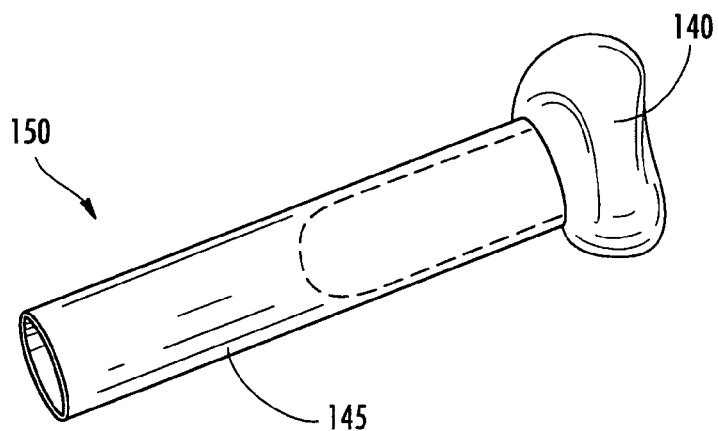
FIGS. 14A and 14B is a perspective view of a ERL insert assembly for insertion into a ribbon cable.
Figure 14B:
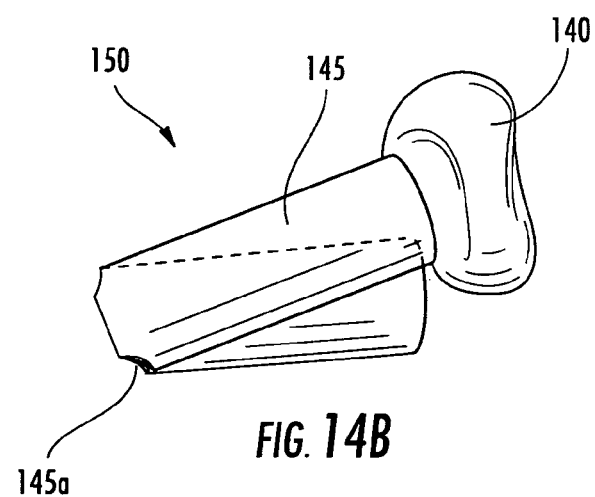

Illustratively, FIGS. 14A and 14B are respective perspective views showing an exemplary embodiment of ERL insert assembly 150 suitable for insertion into a fiber optic cable according to the concepts of the present invention. As shown, ERL insert assembly 150 includes resilient plug 140 and a tube 145. Using a ERL insert assembly with a tube aids with installation of the same into the fiber optic cable because the tube reduces the coefficient of friction when inserting the ERL insert assembly (i.e., the tube acts like a sled for the assembly). The size and/or shape of both resilient plug 140 and tube 145 are selected based upon the type and dimensions of the fiber optic cable being used. In other words, the tube 145 should have a diameter that is suitable for insertion into the opening of the fiber optic cable and the resilient plug 140 should be sized to have a friction fit within tube 145. By way of example, tube 145 has a diameter of about 25 millimeters and resilient plug 140 is a portion of an earplug (e.g., such as about half an ear plug). As depicted by FIG. 14A, a portion of resilient plug 140 is inserted into tube 145 with a portion of resilient plug 140 extending beyond tube 145. For instance, a minimum of about 5 millimeters of resilient plug 140 should extend beyond tube 145 for inhibiting movement of the optical fiber ribbon(s) when the ERL insert assembly 150 is inserted into the fiber optic cable. Thereafter, tube 145 of ERL insert assembly 150 may be folded as shown in FIG. 14B to ease the insertion of the same into the fiber optic cable using an appropriate tool. Optionally, one or more of the folded corners 145a of tube 145 may be cut off to remove the sharp edges that may hang-up and make the installation into the fiber optic cable more difficult.

Figure 15:
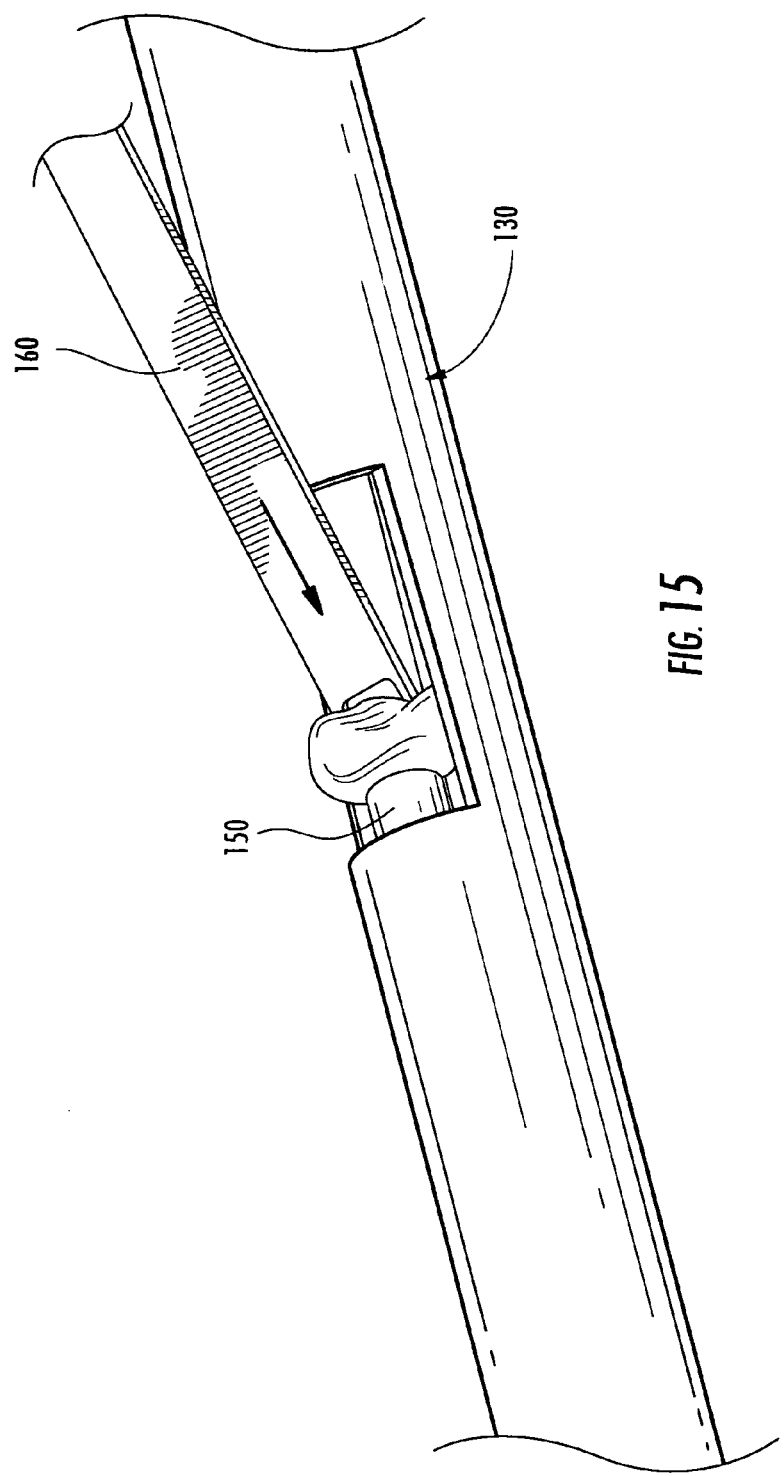
Figure 19A:
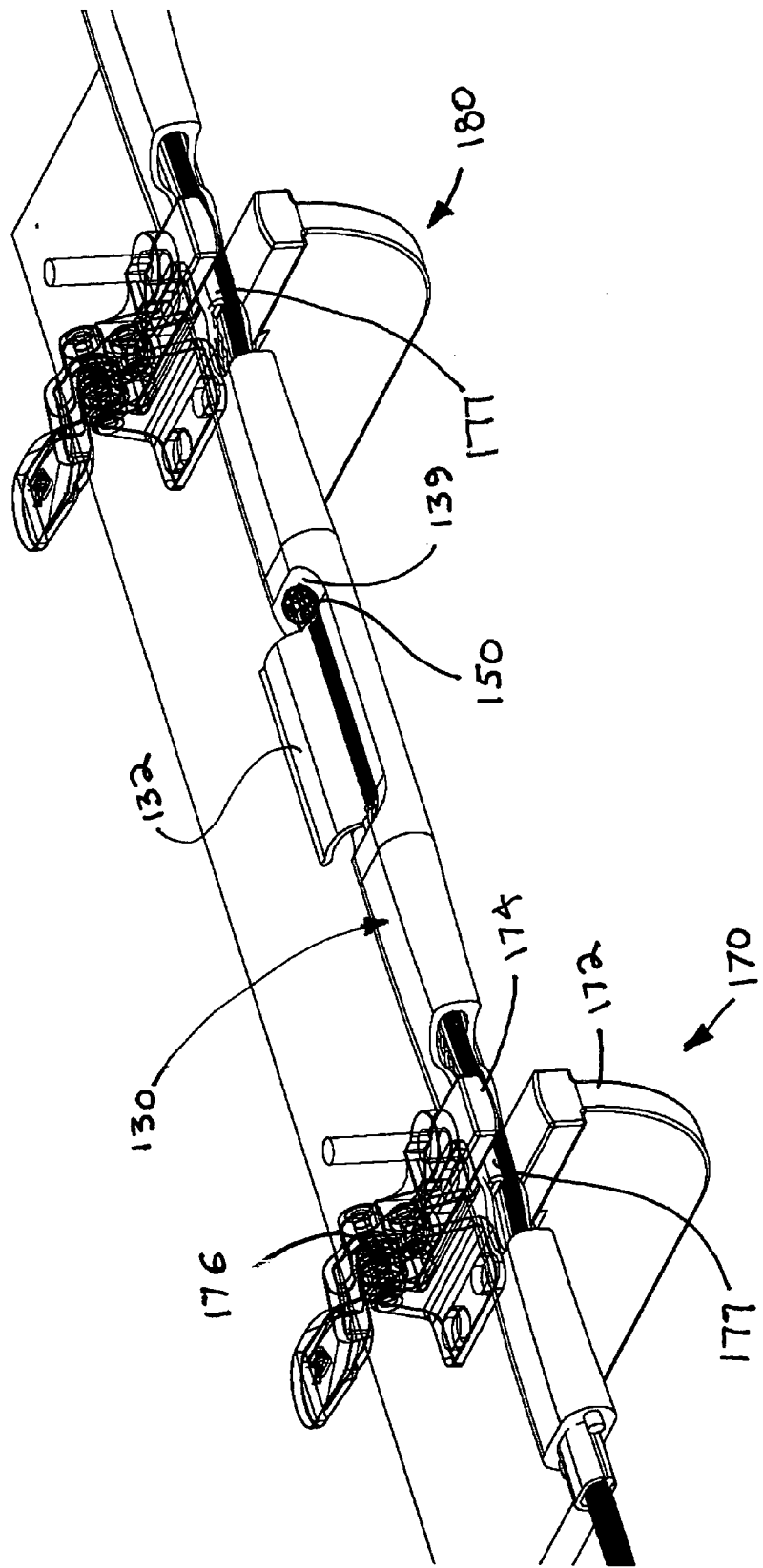
FIGS. 19A and 19B are isometric views of a clamping mechanism acting on the fiber optic cable.
Figure 19B:
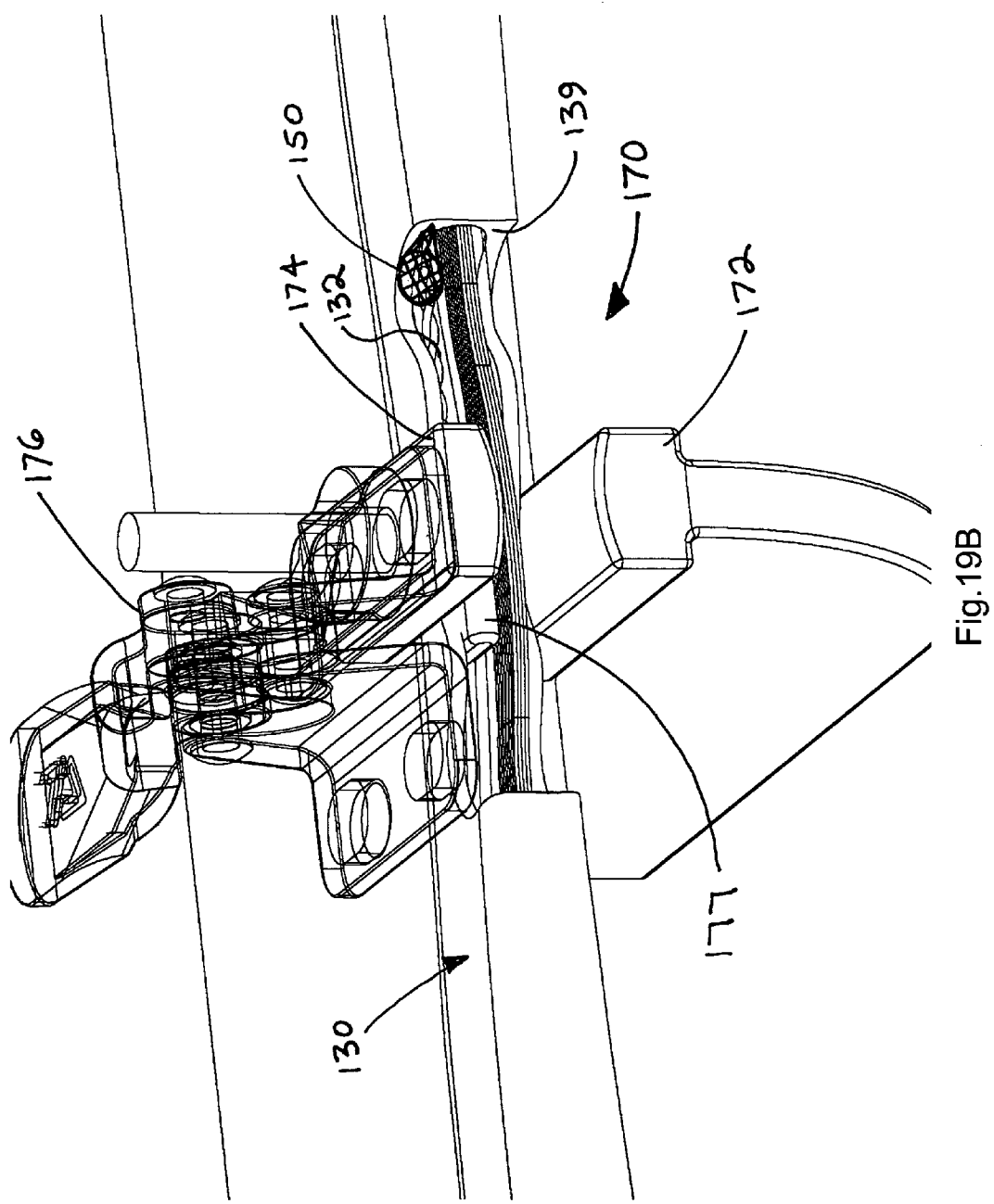

FIGS. 15-17 are perspective views showing the folded ERL insert assembly 150 of FIG. 14B being inserted into the fiber optic cable of FIG. 13 using an appropriate tool 160. As depicted, ERL insert assembly 150 is orientated so that the portion of tube 145 not having resilient plug 140 therein is facing down toward fiber optic cable 130, thereby easing the insertion of the same. Resilient plug 140 may be compressed such as by pinching before insertion into the cable and then it expands afterwards in the cable to create a friction fit within the fiber optic cable, thereby inhibiting translation and/or rotation of the ribbon stack. Additionally, tool 160 engages the folded portion of ERL insert assembly 150 for inserting and pushing it into the upstream end of fiber optic cable 130 (i.e., toward the central office side) relative to the network access point. Generally speaking, tool 160 has a suitable shape and length such as long, slender and flexible to fit within the fiber optic cable to insert the plug or ERL insert assembly to the desired location. ERL insert assembly 150 is first inserted a first suitable distance X1 into the upstream end of fiber optic cable 130 such as about 75 millimeters, but other suitable distances are possible. Thereafter, a second resilient plug 140 or ERL insert assembly 150 may also be inserted into a downstream end of fiber optic cable 130 a second suitable distance X2. By way of example, second ERL insert assembly 145 is inserted a second distance X2 such as about 225 millimeters into the downstream end of fiber optic cable 130, but other suitable second distances are possible. FIG. 18 is a perspective view showing the locations of both an upstream ERL insert assembly and a downstream ERL insert assembly within of fiber optic cable 130. Then, a portion of dry insert 132 can be cut away to access the desired optical fiber(s)/ribbon(s) within fiber optic cable 130 for optical connection with one or more optical fibers of a tether cable or the like as discussed above. After the optical connection and/or other assembly work is completed, a network access point covering 22 like that shown in FIG. 2 can be applied to the network access point. FIGS. 19A,19B show a clamps 170,180 that are capable of holding the optical ribbon stack with an ERL insert 177 (note that portions of the cable jacket are remove for clarity purposes). Clamp 170 is exemplary and it includes for example two clamping jaws 172,174 activated by a clamping mechanism 176 which may include levers, springs, pins, actuators, cylinders, hand grips, or other necessary hardware for actuating the clamping jaws 172,174 to clamp down on the fiber optic cable or a portion of the fiber optic cable. Prior to actuation of clamps 170,180, an ERL insert 177 can be inserted into the fiber optic cable aligned with clamps 170,180, thereby allowing the clamps to restrain the ribbon stack without crushing the cable. While the ribbon stack is clamped, the structure of network access point may be constructed and afterwards the clamps can be released from the cable.

In the various embodiments described herein, the cables may include any optical fiber type including, but not limited to, single mode, multi-mode, bend performance fiber, bend optimized fiber and bend insensitive optical fiber. Fiber types may include microstructured and nanostructured fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns. In preferred embodiments, optical fiber disclosed herein is thus single-mode transmission optical fiber.

In some embodiments, the microstructured optical fibers disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

By "non-periodically disposed" or "non-periodic distribution", we mean that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 mm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes. Additional description of microstructured fibers used in the present invention are disclosed in pending U.S. patent application Ser. No. 11/583,098 filed Oct. 18, 2006; and, Provisional U.S. patent application Ser. Nos. 60/817,863 filed Jun. 30, 2006; 60/817,721 filed Jun. 30, 2006; 60/841,458 filed Aug. 31, 2006; and 60/841,490 filed Aug. 31, 2006; all of which are assigned to Corning Incorporated; and incorporated herein by reference.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A cable assembly, comprising:
   a fiber optic cable including a ribbon stack therein;
   at least one network access location positioned along the fiber optic cable at which at least one fiber of the ribbon stack is preterminated at the network access point; and
   a resilient plug and a tube being a portion an ERL assembly, the ERL assembly is inserted into the fiber optic cable and is at least partially disposed within the fiber optic cable for locking the ribbon stack to the fiber optic cable to inhibit ribbon stack translation at the network access point relative to the fiber optic cable.

2. The cable assembly of claim 1, the resilient plug being partially inserted into the tube, wherein the tube of the ERL insert assembly is folded and inserted into the fiber optic cable.

3. The cable assembly of claim 1, wherein the ribbon stack is non-stranded and the plug contacts a portion of the cable jacket.

4. The cable assembly of claim 1, wherein the ribbon stack is non-stranded and the fiber optic cable includes a dry insert.

5. The cable assembly of claim 1, further including a first ERL insert assembly disposed in an upstream end of the fiber optic cable relative to the network access point and a second ERL insert assembly disposed in a downstream end of the fiber optic cable relative to the network access point.

6. The cable assembly of claim 5, the first ERL insert assembly comprising at least one insert including a portion thereof selected from the group consisting of a foam member of pre-determined cell size, an elastomeric substance, a swellable member, a member coated with a water swellable super-absorbent substance for absorbing water, a spring formed of metal, a spring formed of plastic, a compressible bladder, a KRATON© polymer, a balloon member, a compressible fabric, a compressible woven material, a compressible non-woven material, and a compressible mesh.

7. The cable assembly of claim 1, the cable assembly further including a tether cable.

8. The cable assembly of claim 1, the cable assembly further including a network access point covering.

9. A cable assembly, comprising:
   a fiber optic cable including a ribbon stack therein;
   at least one network access location positioned along the fiber optic cable at which at least one fiber of the ribbon stack is preterminated at the network access point; and
   at least one ERL insert assembly including a resilient plug and a tube wherein the tube is folded, the at least one ERL insert assembly disposed within the fiber optic cable for locking the ribbon stack to the fiber optic cable to inhibit ribbon stack translation at the network access point relative to the fiber optic cable, the at least one ERL insert assembly being disposed within the fiber optic cable.

10. The cable assembly of claim 9, wherein the ribbon stack is non-stranded and the ERL insert assembly includes a plug that contacts a portion of the cable jacket.

11. The cable assembly of claim 9, wherein the ribbon stack is non-stranded and the fiber optic cable includes a dry insert.

12. The cable assembly of claim 9, the ERL insert assembly disposed in an upstream end of the fiber optic cable relative to the network access point and a second ERL insert assembly disposed within a downstream end of the fiber optic cable relative to the network access point.

13. The cable assembly of claim 9, the cable assembly further including a tether cable.

14. The cable assembly of claim 9, the cable assembly further including a network access point covering.

15. The cable assembly of claim 9, the at least one ERL insert assembly comprising at least one insert including a portion thereof selected from the group consisting of a foam member of predetermined cell size, an elastomeric substance, a swellable member, a member coated with a water swellable super-absorbent substance for absorbing water, a spring formed of metal, a spring formed of plastic, a compressible bladder, a KRATON® polymer, a balloon member, a compressible fabric, a compressible woven material, a compressible non-woven material, and a compressible mesh.

16. A method of making cable assembly having a network access point, comprising the steps of:
   providing a fiber optic cable including an optical ribbon stack therein;
   opening the fiber optic cable for creating at least one network access location positioned along the fiber optic cable at which at least one fiber of the optical ribbon stack is preterminated; and
   inserting at least one ERL insert assembly into the opening of the fiber optic cable and positioning the at least one ERL insert assembly within the fiber optic cable for holding the optical ribbon stack to the fiber optic cable to inhibit optical ribbon stack movement at the network access point relative to the fiber optic cable.

17. The method of claim 16, the ERL insert assembly further including a tube, and the method further includes the step of folding the tube.

18. The method of claim 16, the ERL insert assembly further including a tube, and the method further includes the step of folding the tube and then cutting a portion of the tube.

19. The method of claim 16, further including step of positioning a second ERL insert assembly within the fiber optic cable.

20. The method of claim 16, further including the step of attaching a tether cable to the cable assembly.

21. The method of claim 16, further including the step of applying a network access point covering.

22. The method of claim 16, the at least one ERL insert assembly including a portion thereof selected from the group consisting of a foam member of predetermined cell size, an elastomeric substance, a swellable member, a member coated with a water swellable super-absorbent substance for absorbing water, a spring formed of metal, a spring formed of plastic, a compressible bladder, a KRATON® polymer, a balloon member, a compressible fabric, a compressible woven material, a compressible non-woven material, and a compressible mesh.

23. A method of making a cable assembly having a network access point, comprising the steps of:
   providing a fiber optic cable including an optical ribbon stack therein;
   opening the fiber optic cable for creating at least one network access location positioned along the fiber optic cable at which at least one fiber of the optical ribbon stack is preterminated; and
   applying at least one clamping force using clamping jaws for holding the optical ribbon stack to the fiber optic cable; and
   inserting at least one ERL assembly into the fiber optic cable to inhibit optical ribbon stack movement at the network access point relative to the fiber optic cable to prevent ERL dissipation.

* * * * *